(12) United States Patent
Brunken

(10) Patent No.: US 10,807,149 B2
(45) Date of Patent: Oct. 20, 2020

(54) HOLDING DEVICE FOR A TEST SHEET

(71) Applicant: Broetje-Automation GmbH, Rastede (DE)

(72) Inventor: Klaus Brunken, Jaderberg (DE)

(73) Assignee: Broetje-Automation GmbH, Rastede (DE)

(*) Notice: Subject to any disclaimer, the term of this patent is extended or adjusted under 35 U.S.C. 154(b) by 71 days.

(21) Appl. No.: 15/519,202

(22) PCT Filed: Oct. 15, 2015

(86) PCT No.: PCT/EP2015/073888
§ 371 (c)(1),
(2) Date: Apr. 14, 2017

(87) PCT Pub. No.: WO2016/059159
PCT Pub. Date: Apr. 21, 2016

(65) Prior Publication Data
US 2017/0239710 A1  Aug. 24, 2017

(30) Foreign Application Priority Data
Oct. 14, 2014  (DE) ............... 20 2014 104 915 U

(51) Int. Cl.
*B25B 9/02* (2006.01)
*F16P 3/18* (2006.01)
(Continued)

(52) U.S. Cl.
CPC ............... *B21J 15/42* (2013.01); *B21J 15/28* (2013.01); *B25B 5/003* (2013.01); *B25B 9/02* (2013.01); *F16P 3/18* (2013.01)

(58) Field of Classification Search
CPC ........... B25B 5/003; B25B 5/006; B25B 9/00; B25H 5/00; B23Q 1/03; B23Q 1/0009;
(Continued)

(56) References Cited

U.S. PATENT DOCUMENTS 1,929,484 A * 10/1933 Davis ..................... D06F 71/06
192/131 R
1,994,414 A * 3/1935 Davis ..................... D06F 71/323
38/40
(Continued)

FOREIGN PATENT DOCUMENTS

CN  203509275  4/2014
DE  3918673  12/1990
(Continued)

OTHER PUBLICATIONS

"German Search Report," for Priority Application No. DE202014104915.0 dated Sep. 7, 2015 (5 pages).
(Continued)

*Primary Examiner* — Tyrone V Hall, Jr.
*Assistant Examiner* — Abbie E Quann
(74) *Attorney, Agent, or Firm* — Pauly, DeVries Smith & Deffner LLC

(57) ABSTRACT

A holding device for a test sheet includes a receiving arrangement for engagement with the test sheet, a handle arrangement connected rigidly to the receiving arrangement for a user for positioning the test sheet, and a pushbutton arrangement for producing a switching signal on the basis of an actuation by the user.

19 Claims, 3 Drawing Sheets

(51) Int. Cl.
*B21J 15/42* (2006.01)
*B21J 15/28* (2006.01)
*B25B 5/00* (2006.01)

(58) Field of Classification Search
CPC ... B23Q 3/00; B23Q 3/06; B23P 11/00; B23P 19/00; F16P 3/18; F16P 1/00; B25J 1/04; B25J 1/12; B25J 9/0096
USPC .... 29/243.54, 235, 243.5, 243.53, 238, 239; 192/131 R; 100/344; 711/177; 409/134; 83/370; 72/10.8; 294/22, 28, 213
See application file for complete search history.

(56) References Cited

U.S. PATENT DOCUMENTS 3,628,357 A * 12/1971 Luenser .................. F16P 3/00
    72/10.8
6,296,035 B1 * 10/2001 Yamamoto .............. B29B 17/00
    156/750

FOREIGN PATENT DOCUMENTS

| | | |
|---|---|---|
| DE | 4016169 | 11/1991 |
| DE | 69401200 | 6/1997 |
| EP | 1772204 | 4/2007 |
| WO | 2006122379 | 11/2006 |
| WO | 2016059159 | 4/2016 |

OTHER PUBLICATIONS

"International Report on Patentability" for PCT Application No. PCT/EP2015/073888 dated Apr. 18, 2017 (7 pages).

"International Search Report and Written Opinion," for PCT Application No. PCT/EP2015/073888 dated Feb. 15, 2016 (11 pages).

* cited by examiner

HOLDING DEVICE FOR A TEST SHEET

CROSS-REFERENCE TO RELATED APPLICATIONS

This application is a national stage application under 35 U.S.C. 371 of International Patent Application Serial No. PCT/EP2015/073888, entitled "Holding Device for a Test Sheet," filed Oct. 15, 2015, which claims priority from German Patent Application No. DE 20 2014 104 915.0, filed Oct. 15, 2014 the disclosure of which is incorporated herein by reference.

FIELD OF THE TECHNOLOGY

The disclosure relates to a holding device for a test sheet and to a machine tool for metal working.

BACKGROUND

In the case of machine tools for metal working and especially in the case of rivet machines for setting rivet connections, there is regularly the desire to carry out the metal working operation or the rivet setting operation on an experimental basis on a basic material sample. Said basic material sample is generally formed by a metal sheet or by stacks of sheets, which metal sheet or stack of sheets is also referred to as a test sheet or test coupon.

Specifically in the sphere of aerospace production, the working of very large workpieces is frequently envisaged, and therefore a test coupon which is smaller than said workpieces cannot readily be handled by the positioning devices provided for the large workpieces. For this reason, specifically in this sphere, the test coupon is regularly positioned manually by a user in a working region of the machine tool in such a manner that the metal working step can be undertaken on the test coupon.

This approach is problematic in various respects. Firstly, it requires the user in particular to put his hands into the working region of the machine, which is specifically intended to be prevented during regular operation and constitutes a risk of a work accident. Also in order to avoid such an entry of a user into the working region or even an approach thereto, the triggering of the metal working step requires that the corresponding user regularly operates a control arrangement of the machine tool with both hands. This control arrangement is regularly arranged with respect to the working region in such a manner that the user operating the control arrangement is located at a sufficient distance from the working region, and therefore the user generally cannot hold the test coupon in the working region at the same time. Therefore, two people are required for undertaking the metal working step on the test coupon. The necessity of coordination between these two people increases the probability of triggering the metal working step at an inopportune moment and therefore also the risk of a work accident.

SUMMARY

Taking this as the starting point, the problem of the disclosure consists in undertaking a metal working step on a test sheet by a machine tool on an experimental basis in both a simpler and also safer manner.

The problem mentioned is solved for a holding device for a test sheet and for a machine tool for metal working.

Essential to various embodiments of the disclosure is the finding that a holding device can be provided both with a receiving arrangement for the test sheet, by means of which the received test sheet can be positioned in the working region at the correct location, with the correct alignment and with a sufficient distance of the user from said working region being maintained, and also with a pushbutton arrangement for triggering the metal working step on the machine tool. In this manner, it is possible for an individual user to safely position the test sheet in the working region of the machine tool and at the same time to have the triggering of the metal working step under his own control. The carrying out of the metal working step on the test sheet thereby becomes safer and can be executed by an individual person.

Various embodiments relate to the requirement of ensuring gripping of the holding device with two hands such that it can be virtually excluded that one hand of the user of the holding device is in a hazardous region of the machine tool when the metal working step is triggered.

Portable pushbutton arrangements for enabling safety-critical operations, for example "permissive or enabling switches", are already known from the prior art. Various embodiments provide the possibility of using such pushbutton arrangements as a component in a holding device according to the proposal. In this manner, the generally certified dependability ensured by the known pushbutton arrangements can be used for the solution according to the proposal.

An embodiment in turn relates to a configuration of the pushbutton arrangement that in each case necessitates complete grasping of the pushbutton arrangement by the user for actuation purposes.

Various embodiments provide a variant, according to which the pushbutton arrangement has an actuating path with different actuating regions. In order to trigger the metal working step, actuation in a defined actuating region is then required.

Various embodiments relate to an ergonomically particularly advantageous design of the holding device, which permits the precise positioning of the test sheet with simultaneously very good control of the triggering of the metal working step.

An embodiment provides a holding device for a test sheet, with a receiving arrangement for engagement with the test sheet, a handle arrangement connected rigidly to the receiving arrangement for a user for positioning the test sheet, and a pushbutton arrangement for producing a switching signal on the basis of an actuation by the user.

In various embodiments, the holding device comprises a transmitting device for transmitting the switching signal, such as to a controller of a machine tool.

In various embodiments, the holding device is portable, in particular by the user gripping the handle arrangement.

In various embodiments, the handle arrangement is configured for gripping by the user with both hands, wherein the handle arrangement has two, in particular spaced-apart, individual handles, furthermore in particular for grasping, by one hand each of the user.

In various embodiments, the pushbutton arrangement is arranged in such a manner that an actuation by the user requires in particular gripping of the handle arrangement by the user with both hands, and can require grasping of the two individual handles by one hand each of the user.

In various embodiments, the pushbutton arrangement forms an, optionally releasable, part of the handle arrangement.

In various embodiments, the pushbutton arrangement has a main finger pushbutton and a secondary finger pushbutton which are both actuable by different fingers of the same hand of the user, wherein the pushbutton arrangement has an elongate pushbutton unit, and the main finger pushbutton and the secondary finger pushbutton are arranged offset with respect to each other along a pushbutton longitudinal axis of the pushbutton unit, in particular in that the pushbutton unit forms part of an individual handle or is arranged in an individual handle.

In various embodiments, the pushbutton arrangement produces the switching signal only if the main finger pushbutton and the secondary finger pushbutton are actuated in particular simultaneously, such that the simultaneous actuation of the main finger pushbutton and of the secondary finger pushbutton requires grasping of the respective pushbutton unit.

In various embodiments, the pushbutton arrangement has two pushbutton units, wherein the pushbutton units are arranged on one individual handle each, in particular within one individual handle each.

In various embodiments, the two pushbutton units each have a main finger pushbutton and a secondary finger pushbutton.

In various embodiments, the pushbutton arrangement produces the switching signal only if an in particular simultaneous actuation takes place on both pushbutton units, in some embodiments produces the switching signal only if the main finger pushbutton of the two pushbutton units and the secondary finger pushbutton of at least one pushbutton unit are actuated.

In various embodiments, the actuation of the pushbutton arrangement takes places along an actuating path with at least two actuating regions, wherein the main finger pushbutton and/or the secondary finger pushbutton, in particular of the two pushbutton units, each have at least two actuating regions.

In various embodiments, the actuating regions have an active region and an inactive region, and in that the switching signal is produced only upon an actuation in the active region, such that the switching signal can be produced only if an in particular simultaneous actuation of the main finger pushbutton of the two pushbutton units and of the secondary finger pushbutton of at least one pushbutton unit in the active region takes place.

In various embodiments, the holding device has a frame with two supports which are arranged substantially parallel and are of substantially elongate design, wherein the receiving arrangement is arranged at an adjacent longitudinal end of each of the two supports, in particular wherein the handle arrangement is arranged on a respective handle region of the supports, said handle region being angled in particular with respect to a longitudinal axis of the supports, such as the individual handles are arranged on one support each.

An embodiment provides a machine tool for metal working, in particular for producing rivet connections, with an end effector, in particular for setting rivets, a controller for activating the end effector, and a holding device as described herein, wherein the controller is configured to activate the end effector so as to trigger the switching signal.

BRIEF DESCRIPTION OF THE DRAWINGS

Further details, features, aims and advantages of the present disclosure are explained in more detail below with reference to drawings reproducing merely one exemplary embodiment. In the drawings.

DETAILED DESCRIPTION

Figure 1:
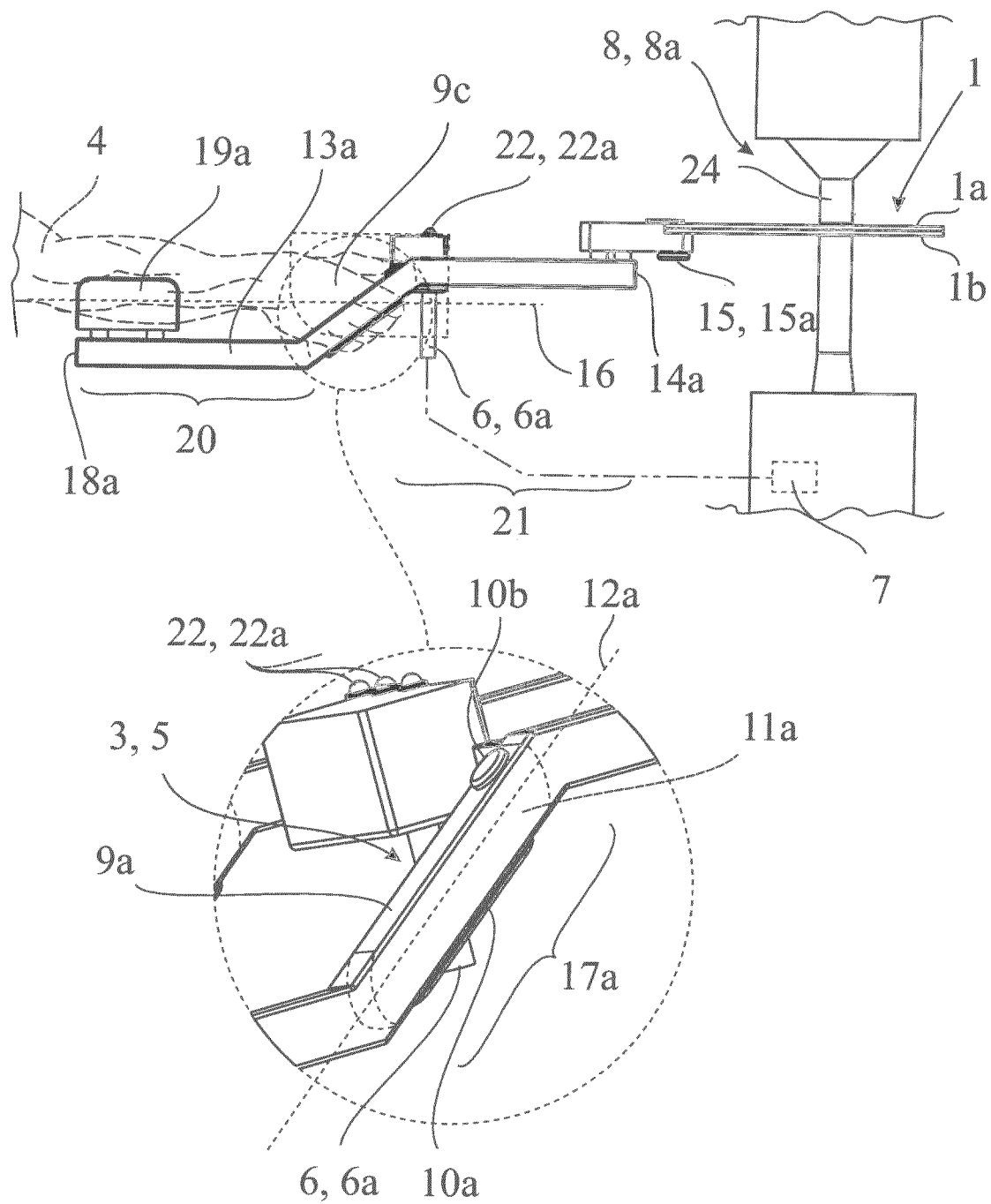
FIG. 1 shows a side view of a machine tool for metal working with a holding device according to the proposal.
Figure 2:
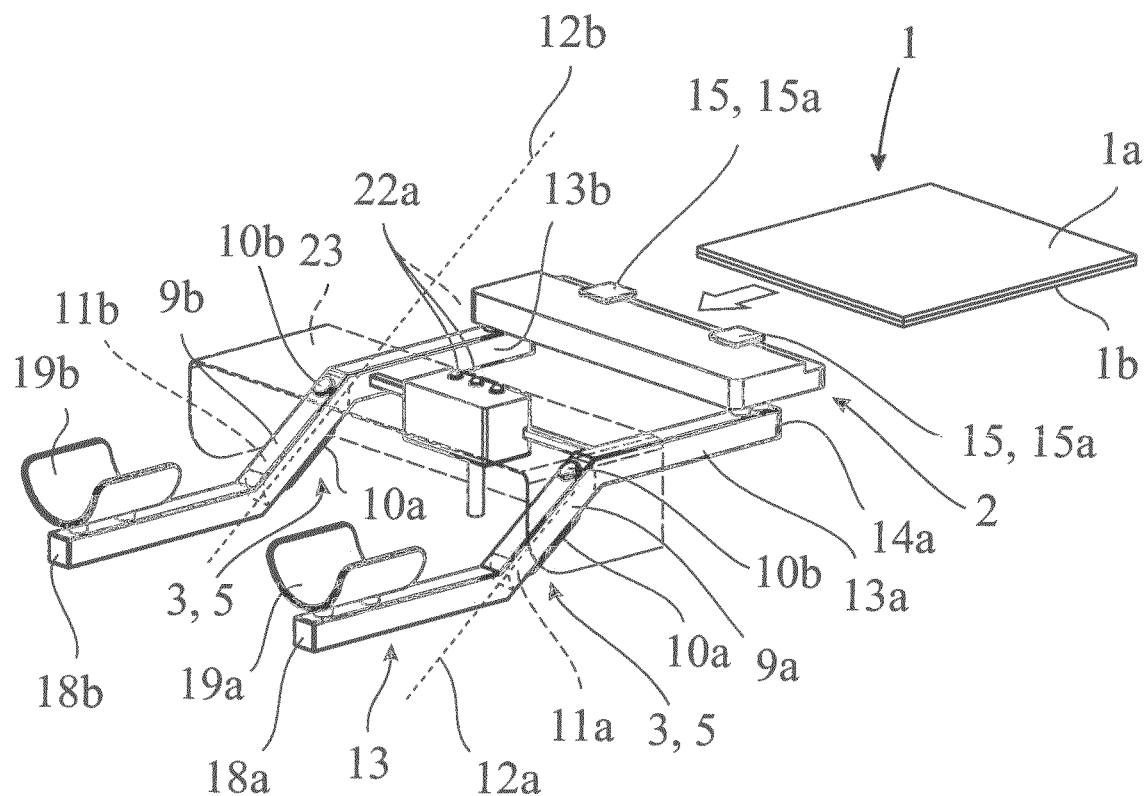
FIG. 2 shows a perspective view obliquely from above of the holding device according to the proposal from FIG. 1.
Figure 3:
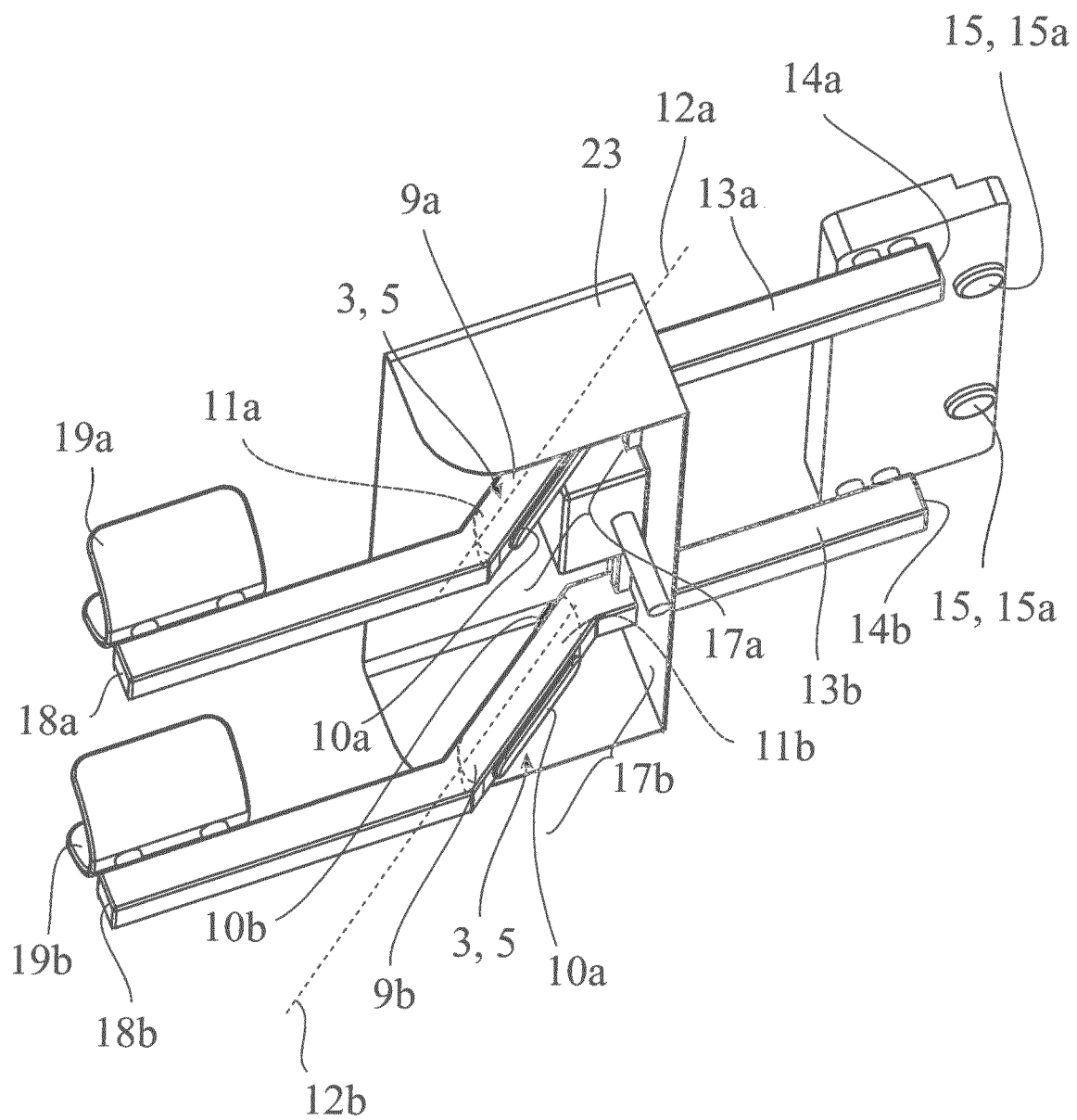
FIG. 3 shows a perspective view obliquely from below of the holding device according to the proposal from FIG. 1.

The holding device according to the proposal for a test sheet 1 has a receiving arrangement 2 for the in particular form-fitting engagement with the test sheet 1. The test sheet 1 can be any desired, in particular flat, workpiece or a stack of sheets on which a metal working step is intended to be carried out on an experimental basis. In the present example, the test sheet 1 is two individual aluminium sheets 1a, b which are stacked one above the other and are intended to be connected to each other with a rivet connection to be set. The receiving arrangement 2 is configured to produce an engagement with the test sheet 1, by means of which engagement the test sheet 1 can be held, raised and positioned. In addition to this potentially form-fitting engagement, dropping out of the test sheet 1 from the receiving arrangement 2 can also be prevented with further measures which are described in more detail below.

The holding device according to the proposal furthermore has a handle arrangement 3 connected rigidly to the receiving arrangement 2 for a user 4 for positioning the test sheet 1. This means that the user 4 can grip the handle arrangement 3 and, owing to the rigid connection, by moving the handle arrangement 3, can analogously move the receiving arrangement 2—and with the latter the test sheet 1, with which it is in engagement—and can therefore also align and position it.

In addition, the holding device according to the proposal has a pushbutton arrangement 5 for producing a switching signal on the basis of an actuation by the user 4. The pushbutton arrangement 5 can produce the switching signal when the pushbutton arrangement 5 is actuated by the user 4, in particular by pressing.

According to an embodiment, the holding device has a transmitting device 6 for transmitting the switching signal. The switching signal can be transmitted to a controller 7 of a machine tool 8, which controller 7 and machine tool 8 are likewise illustrated in FIG. 1. The transmitting device 6 can be both a device for wireless transmission and also, as here, a wired transmission arrangement 6a. In the present exemplary embodiment, the machine tool 8 is a riveting machine 8a. The transmitting device 6 can also be configured to receive signals and data from the controller 7.

In principle, the holding device could be configured to be mounted, for example pivotably, on a fastening point on or in the machine tool 8. However, it can be that the holding device is portable, to be precise especially by the user 4 gripping the handle arrangement 3. This facilitates the use and increases the flexibility of the holding device.

As illustrated in the exemplary embodiment, the handle arrangement 3 is configured for gripping by the user 4 with both hands. This firstly facilitates the carrying and alignment of the holding device and furthermore ensures that the user 4 also actually uses both hands for gripping the handle arrangement 3. This can be implemented by the fact that the handle arrangement 3 has two, in particular spaced-apart, individual handles 9a, b for one hand 9c each of the user 4. These individual handles 9a, b are especially configured for grasping by one hand 9c each. A certain position of the hands is therefore predetermined by the handle arrangement 3

So that this position of the hands of the user 4 is also ensured at the time of producing the switching signal, the pushbutton arrangement 5 can be arranged in such a manner that an actuation by the user 4 requires in particular gripping of the handle arrangement 3 by the user 4 with both hands. It is furthermore here that this gripping with two hands requires grasping of the two individual handles 9a, b by one hand 9c each of the user 4.

In an advantageous manner, the functionality for gripping the holding device and that for producing the switching signal are combined in that the pushbutton arrangement 5 can form a releasable part of the handle arrangement 3. In this manner, as described in more detail below, a pushbutton arrangement 5, for example comprising the permissive and enabling switches already mentioned above, which is already available off the shelf can be used and inserted into the handle arrangement 3 which is then purely mechanical in its construction.

In order to meet the increased safety requirements for the production of the switching signal and in particular to avoid an inadvertent actuation, it can be provided that the pushbutton arrangement 5 has a main finger pushbutton 10a and a secondary finger pushbutton 10b which are both actuable by different fingers of the same hand of the user 4. In this case, as in the exemplary embodiment shown, the secondary finger pushbutton 10b can be provided for actuation by a thumb of this hand, and a main finger pushbutton 10a can be provided for actuation by in particular the middle and ring fingers, optionally also by the index finger, of the same hand. Alternatively, a main finger pushbutton 10a can also be provided for actuation by the index finger, and in turn a secondary finger pushbutton 10b can be provided for actuation by the middle and ring fingers. In this case, both the main finger pushbutton 10a and the secondary finger pushbutton 10b would be placed on the same side of the respective individual handle 9a, b—as in the present case— on opposite sides of the respective individual handle 9a, b. In principle, the allocation here of a pushbutton as main finger pushbutton 10a or as secondary finger pushbutton 10b is as desired.

In some embodiments, the pushbutton arrangement 5 has an elongate pushbutton unit 11a, b, and the main finger pushbutton 10a and the secondary finger pushbutton 10b are arranged offset with respect to each other along a pushbutton longitudinal axis 12a, b of the pushbutton unit 11a, b, which is especially illustrated in FIG. 1. It can especially be the case here that, as likewise illustrated in FIG. 1, the pushbutton unit 11a, b forms part of an individual handle 9a, b or is arranged in an individual handle 9a, b. Ensuring simultaneous gripping and triggering is therefore implemented in a particularly simple manner. A "pushbutton unit" can be understood here and below as meaning both a separate unit with pushbuttons with their own pushbutton housing and also a device with pushbuttons, which device is formed integrally or monolithically with the respective individual handle 9a, b and consequently shares a housing therewith. The pushbutton unit can also be arranged releasably in the individual handle 9a, b.

In order to reduce the risk of unintentional triggering of the switching signal even further, it can be provided that the pushbutton arrangement 5 produces the switching signal only if the main finger pushbutton 10a and the secondary finger pushbutton 10b are in particular actuated simultaneously. Furthermore in particular, the simultaneous actuation of the main finger pushbutton 10a and of the secondary finger pushbutton 10b can in this connection require grasping of the respective pushbutton unit 11a, b.

As illustrated in the exemplary embodiment of FIG. 1, it can be that the pushbutton arrangement 5 has two pushbutton units 11a, b. The pushbutton units 11a, b are arranged especially here on one individual handle 9a, b each and in particular within the respective individual handle 9a, b. It is likewise possible that the two pushbutton units 11a, b each have a main finger pushbutton 10a and a secondary finger pushbutton 10b.

Building thereon, the triggering safety is improved even further if it is provided that the pushbutton arrangement 5 produces the switching signal only if an in particular simultaneous actuation takes place on both pushbutton units 11a, b, and optionally only if the main finger pushbutton 10a of the two pushbutton units 11a, b and the secondary finger pushbutton 10b of at least one pushbutton unit 11a, b—i.e. corresponding to a total of at least three pushbuttons—are actuated. It can be arbitrary whether the secondary finger pushbutton 10b of one or the other pushbutton unit 11a, b is involved. In this manner, by means of a relatively long actuation of the main finger pushbutton 10a, a basic standby state for producing the switching signal can be produced, in which basic standby state the correct placing of the hands of the user 4 on the pushbutton arrangement 5 is already ensured. For the precise determination of the exact production time of the switching signal, the actuation of an individual secondary finger pushbutton 10b then suffices, wherein the special selection of the pushbutton unit 11a, b can then be simply dependent on whether the user 4 is right-handed or left-handed.

Each pushbutton unit 11a, b can also have more than two finger pushbuttons, i.e. not only one main finger pushbutton 10a and one secondary finger pushbutton 10b, wherein the actuation of more than two finger pushbuttons and especially of all finger pushbuttons of the two pushbutton units 11a, b can then also be required for triggering the switching signal.

A special characteristic in the case of safety switches, which include the abovementioned enabling and permissive switches, is that the individual pushbuttons have an actuating path with a plurality of actuating regions. In the case of permissive switches, a risky working step can be initiated only if the corresponding pushbutton is held or actuated in a central actuating region. This ensures that both complete release of the pushbutton and also heavier actuation—as both reactions are conceivable as a reflex in a moment of shock—terminates the risky working step and leads, for example, to an emergency switch off. Accordingly, it can be in the present case for the actuation of the pushbutton arrangement 5 to take place along an actuating path with at least two actuating regions. The main finger pushbutton 10a and/or the secondary finger pushbutton 10b, in particular of the two pushbutton units 11a, b, can especially in each case have here at least two actuating regions—and therefore also three actuating regions as in the abovementioned example of the safety switch.

This variant can advantageously be refined by the fact that the actuating regions have an active region and an inactive region, and that the switching signal is produced only upon an actuation in the active region. Specifically—if a plurality of pushbuttons are present—the switching signal is produced only upon an in particular simultaneous actuation of more than one pushbutton in the active region. If a plurality of pushbutton units 11a, b are present, it may be correspondingly provided for the switching signal to be produced only upon an actuation of the main finger pushbutton 10a of the two pushbutton units 11a, b and of the secondary finger pushbutton 10b of at least one pushbutton unit 11a, b in the active region.

With regard to the structural configuration of the holding device according to the proposal, it can be that the holding device has a frame 13 with two supports 13a, b which are arranged substantially in parallel and are of substantially elongate design. It can be here that—as illustrated in the exemplary embodiment—the receiving arrangement 2 is arranged at an adjacent longitudinal end 14a, b of each of the two supports 13a, b. The adjacent longitudinal end 14a, b of each of the two supports should be understood in the present context as meaning a pair consisting of a first longitudinal end 14a of a first support 13a and a second longitudinal end 14b of a second support 13b, said longitudinal ends pointing in the same direction, based on the parallel alignment of the supports 13a, b. For particularly reliable receiving of the test sheet 1, the receiving arrangement 2 can have a fixing arrangement 15 for the fastening of the test sheet 1, the fixing arrangement 15 in the present case being a clamping punch-type arrangement 15a.

Furthermore, it can be provided that the handle arrangement 3 is arranged on a respective handle region 17a, b of the supports 13a, b. By means of the substantially elongate design, the supports 13a, b have a longitudinal axis 16. Said respective handle region 17a, b can in each case also be arranged substantially centrally with respect to said longitudinal axis 16, as illustrated in the drawings. It is likewise possible for the respective handle region 17a, b to be arranged at an angle to a longitudinal axis 16 of the supports 13a, b. The resulting "swan neck shape" of the supports 13a, b, which is also clear from the drawings, does not signify any limitation of the substantially elongate design of the supports 13a, b or any contradiction to the presence of a longitudinal axis 16. It is likewise possible for the individual handles 9a, b to be arranged on one support 13a, b each.

Further advantageous structural configurations make provision for underarm rests 19a, b for the support of a respective user arm to be provided on user-side longitudinal ends of the supports 13a, b—user ends 18a, b. A rest distance 20 from the underarm rests 19a, b to the handle region 17a, b along the longitudinal axis 16 can correspond substantially here to a receiving distance 21 from the receiving arrangement 2 to the handle region 17a, b along the longitudinal axis 16. Such underarm rests 19a, b facilitate the carrying of heavier test sheets 1 with the holding device.

It is likewise possible for the holding arrangement to have a display device 22 with illuminated displays 22a for displaying an actuating state of the pushbutton arrangement 5. Said display device 22 can also reproduce signals from the controller 7 of the machine tool 8. Finally, it can be provided, as reproduced in the drawings, that the holding arrangement has a covering arrangement 23 which covers the handle arrangement and in particular the individual handles 9a, b in the direction of the receiving arrangement 2. In particular, the covering arrangement 23 can at least in regions form a covering plane in which the longitudinal axis 16 also lies.

A machine tool 8 according to the proposal for metal working, and here in particular for producing rivet connections, has an end effector 24 which is configured here especially for setting rivets. The machine tool 8 according to the proposal likewise has a controller 7 for activating the end effector 24, and a holding device according to the proposal. The machine tool according to the proposal is characterized in that the controller 7 is configured to activate the end effector 24 so as to trigger the switching signal. Consequently, in the present exemplary embodiment, the production of a rivet connection on the test sheet 1 is triggered. Further configurations of the machine tool according to the proposal emerge from the corresponding features and configurations of the holding device according to the proposal.

The invention claimed is:

1. A holding device for a test sheet, comprising a receiving arrangement for engagement with the test sheet, a handle arrangement connected rigidly to the receiving arrangement such that a user is able to position the test sheet, and a pushbutton arrangement for producing a switching signal to be sent to a machine tool on the basis of an actuation by the user,
wherein the holding device is configured to fix the test sheet to the receiving arrangement,
wherein the holding device is configured such that the test sheet is aligned or positioned by the user by moving the handle arrangement,
wherein the receiving arrangement is configured to retain the test sheet in a fixed position relative to the handle arrangement such that the handle arrangement and the test sheet move analogously, and
wherein holding device is portable relative to the machine tool.

2. The holding device according to claim 1, wherein the holding device comprises a transmitting device for transmitting the switching signal.

3. The holding device according to claim 1, wherein the handle arrangement is configured for gripping by the user with both hands.

4. The holding device according to claim 1, wherein the pushbutton arrangement is arranged so that an actuation by the user requires gripping of the handle arrangement by the user with both hands.

5. The holding device according to claim 4, wherein the pushbutton arrangement forms a part of the handle arrangement.

6. The holding device according to claim 1, wherein the pushbutton arrangement has a main finger pushbutton and a secondary finger pushbutton which are both actuable by different fingers of a same hand of the user, wherein the pushbutton arrangement has an elongate pushbutton unit, and the main finger pushbutton and the secondary finger pushbutton are arranged offset with respect to each other along a pushbutton longitudinal axis of the pushbutton unit.

7. The holding device according to claim 6, wherein the pushbutton arrangement produces the switching signal only if the main finger pushbutton and the secondary finger pushbutton are actuated simultaneously.

8. The holding device according to claim 1, wherein the pushbutton arrangement has two pushbutton units.

9. The holding device according to claim 8, wherein the two pushbutton units each have a main finger pushbutton and a secondary finger pushbutton.

10. The holding device according to claim 8, wherein the pushbutton arrangement produces the switching signal only if a simultaneous actuation takes place on both said pushbutton units.

11. The holding device according to claim 10, wherein the actuation of the pushbutton arrangement takes places along an actuating path with at least two actuating regions.

12. The holding device according to claim 11, wherein at least one of the two actuating regions has an active region and an inactive region, and wherein the switching signal is produced only upon an actuation in the active region.

13. The holding device according to claim 1, wherein the holding device has a frame with two supports which are arranged substantially parallel and are of substantially elongate design.

14. A machine tool for metal working, comprising an end effector, a controller for activating the end effector, and a holding device according to claim 1, wherein the controller is configured to control the end effector to be triggered upon the switching signal.

15. The holding device according to claim 2, wherein the transmitting device transmits the switching signal to a controller of a machine tool.

16. The holding device according to claim 3, wherein the handle arrangement has two spaced-apart individual handles.

17. The holding device according to claim 7, wherein the simultaneous actuation of the main finger pushbutton and of the secondary finger pushbutton requires grasping of the pushbutton unit.

18. The holding device according to claim 8, wherein each of the pushbutton units are arranged on individual handles.

19. The holding device according to claim 11, wherein a main finger pushbutton has at least two actuating regions, a secondary finger pushbutton has at least two actuating regions; or both the main finger pushbutton and the secondary finger pushbutton have the at least two actuating regions.

\* \* \* \* \*